July 17, 1951     H. SEBEL     2,560,703
OCCUPANT PROPELLED ROUNDABOUT
Filed June 14, 1947     2 Sheets-Sheet 1
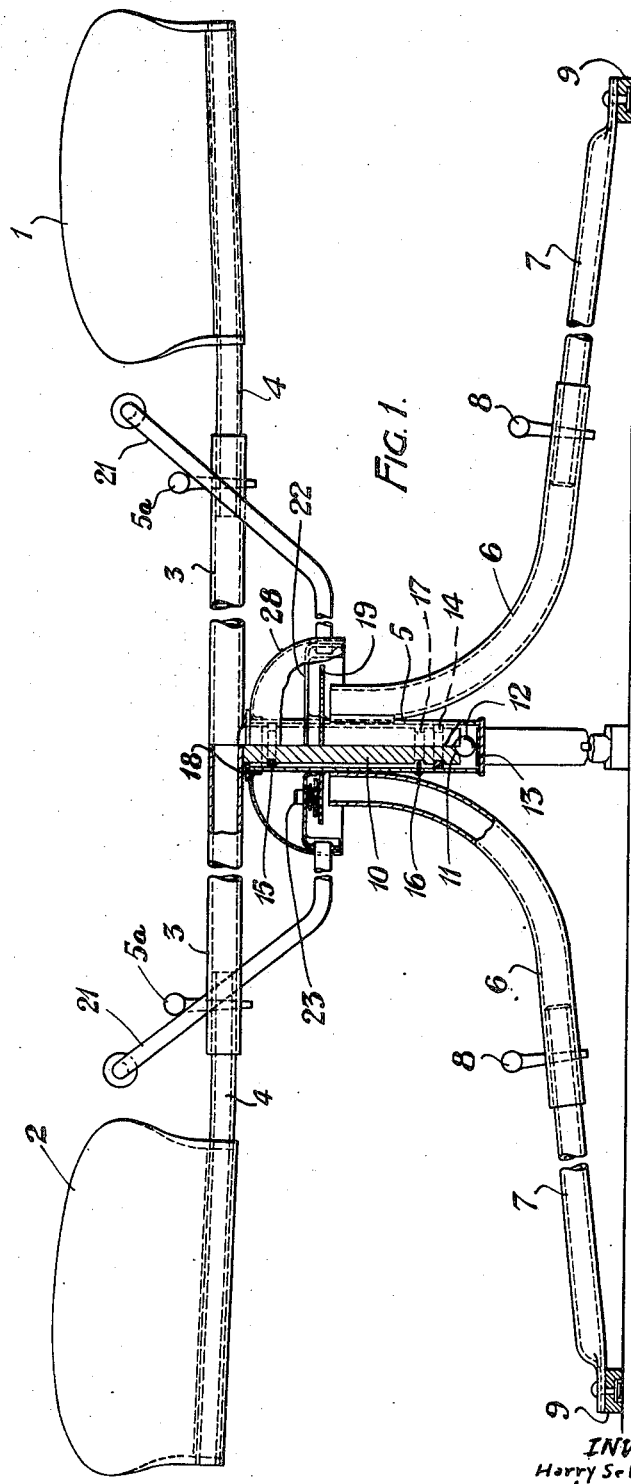
INVENTOR
Harry Sebel
By *George H. Casey*
ATTORNEY

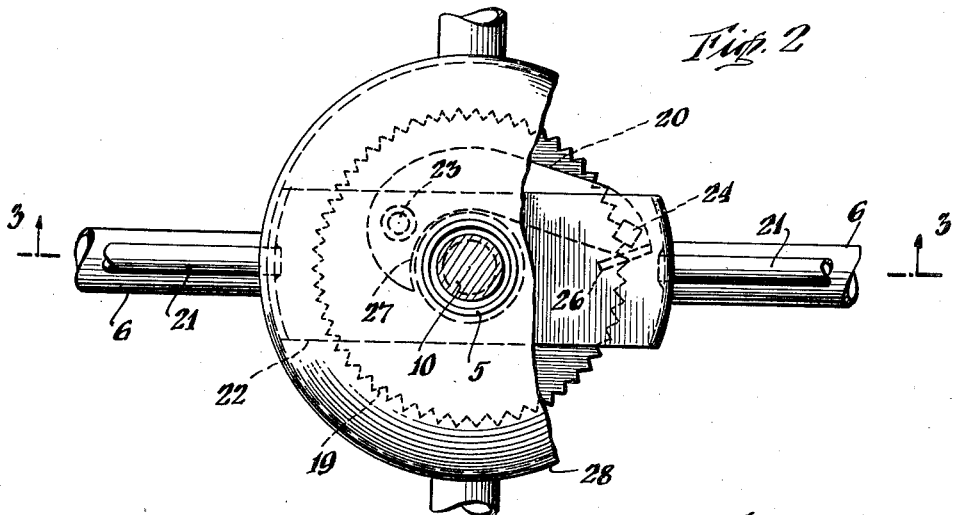
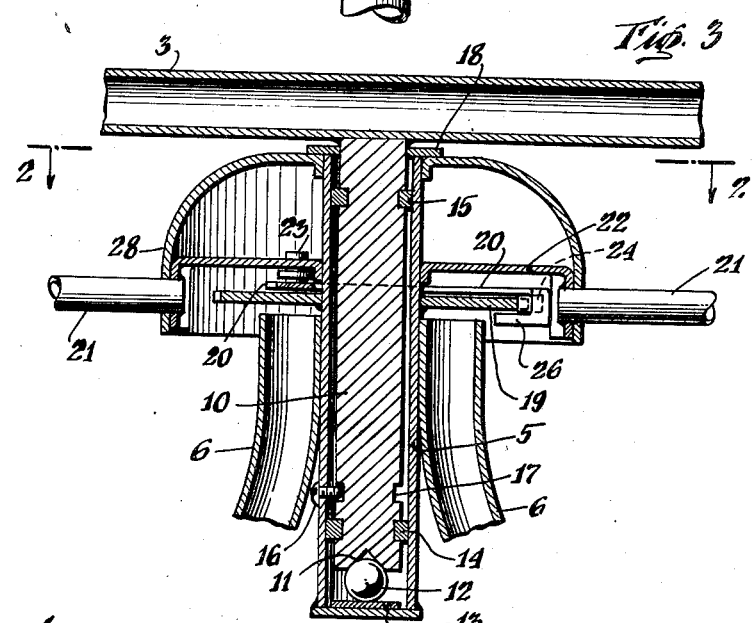
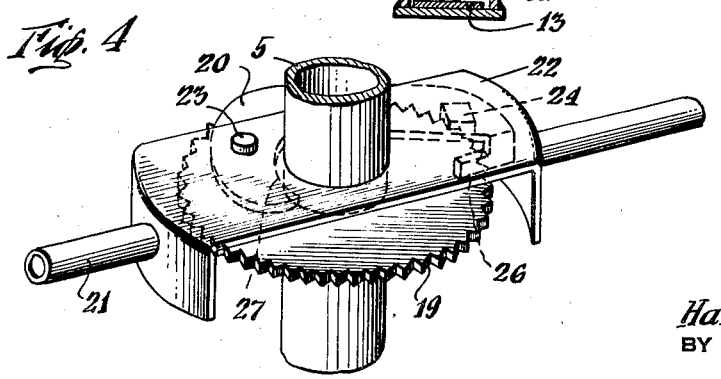

Patented July 17, 1951

2,560,703

UNITED STATES PATENT OFFICE 2,560,703

OCCUPANT PROPELLED ROUNDABOUT

Harry Sebel, London, England

Application June 14, 1947, Serial No. 754,646
In Great Britain March 26, 1945

2 Claims. (Cl. 272—33)

The present invention relates to amusement devices and more particularly to round-abouts for children.

An object of the invention is to provide a round-about principally for young children which is safe in operation and one in which the child provides its own motive power.

A further feature of the invention is to provide a support for the round-about which contains the bearings for carrying the seats or saddles and which also embodies an improved ratchet drive for the round-about.

Other features of the invention will be apparent from the accompanying drawings and description of the accompanying drawings in which:

Figure 1 shows partly in section a round-about in accordance with the present invention, and Figure 2 shows in plan a detail of the ratchet drive.

Figure 3 is a cross-sectional view taken along the line 3—3 of Figure 2.

Figure 4 is a perspective view of the pawl and ratchet mechanism shown in Figures 2 and 3.

Referring to the drawings the round-about comprises a pair of seats 1 and 2 which are supported at the ends of oppositely extending radial arms 3. In practice each seat is mounted upon a short shaft 4 which fits into the radial arm 3 and is secured in position by means of a ball-headed pin 5a.

The radial arms 3 are shown as a single length of steel or other tubing which is attached as by welding to the upper end of a vertical shaft 10 journaled in a central support or column generally designated as 5. This centre column 5 is carried on four splayed legs 6 which are provided with extensions 7 secured to the legs 6 in the same manner as the seat shaft and the arm 3 by means of ball-headed pins 8. The extensions 7 are each provided with a rubber pad 9 which serves to prevent the round-about creeping if used on a smooth surface. The extensions 7 are of such a length that the rubber feet 9 lie beyond the circular path followed by the centers of the seats 1 and 2. This provides the round-about with great stability and the toy may even be used with only a single rider without overbalancing.

The shaft 10 is provided at its base with a conical recess 11 which acts as a bearing surface for a hardened steel ball 12 which in turn rides on a bearing disc 13 supported by the closed lower end of column 5. This assembly serves to take the rotating weight of the seats 1 and 2. To maintain the shaft 10 in alignment in the column 5, roller bearings 14 and 15 are provided which roll against the inner face of the column 5 and take any lateral thrust imposed on the shaft 10.

To prevent the shaft 10 from accidentally riding up the column 5 a screw plug 16 which is threaded into the column 5 projects into a circumferential groove 17. Normally, of course, the plug 16 is entirely clear of the groove 17, and only makes contact should the shaft 10 attempt to ride up inside the column 5. To close the column 5 so as to prevent dirt and other foreign matter from entering the bearings for the shaft 10 and also to prevent oil or other lubricant from leaving the column 5 a rubber, felt or other washer 18 is fitted on to the top of the shaft 10.

The round-about may be operated by children in the seats 1 and 2 by means of a pair of handles 21 connected to a central hub member 22, which is rotatably mounted on the outside of the column 5. The hub 22 carries a pin 23 on which is pivotally mounted a pawl 20 having arms extending unequal distances from opposite sides of the pin so that the pawl is unbalanced. The longer arm of the pawl 20 carries a tooth 24 which depends therefrom into a position adjacent the teeth formed on the periphery of a ratchet wheel 19 which is fixed to the column 5. The same arm of the pawl is also provided with an extension 26 which lies under the ratchet wheel 19 and prevents the tooth 24 from moving upwardly so as to become disengaged from the wheel 19. The short arm of the pawl 20 is formed with a stop 27 which limits the movement of tooth 24 away from the teeth of the ratchet wheel 19.

Since the pawl 20 is unbalanced, it will be understood that when the hub 22 is rotated, the pin 23 will follow that rotation, but the tooth 24 will lag behind that rotation because of the inertia of the unbalanced pawl. Referring to Figure 2, if the hub 22 is rotated clockwise from the position shown, the inertia of the pawl 20 makes the tooth 24 move out of engagement with the teeth of ratchet wheel 19. On the other hand, if an attempt is made to rotate the hub counter-clockwise, the inertia of the pawl 20 will carry the tooth 24 into engagement with the teeth 19, so that riders grasping the outer ends of the handle 21 will have a firm support against which to pull to produce rotation of the seats.

In order to protect the drive and to prevent access to the drive a protection dome 28 is secured to the dished member 22 so that its skirt hangs below the level of the ratchet wheel 19 its top being suitably apertured to ride freely round the column 5 underneath the washer 18.

In use the rider grips the handle 21 and pushes it forward, thereby rotating it and the member 22 about the column 5 in a clockwise direction, as viewed in Fig. 2. Pivot pin 23 is carried along with the member 22. As the pin 23 starts to move clockwise, this motion is opposed by a reactive force set up by the stationary ratchet wheel 19 on the tooth 24. Due to the diagonal formation of the teeth on the ratchet wheel and the tooth 24, the tooth 24 is forced outwardly of the teeth of the ratchet wheel and in so moving turns the pawl 20 slightly counter-clockwise about the pin 23. The inertia of the pawl 20 cooperates in producing this counter-clockwise movement, as pointed out above. The projection 27 on the ratchet wheel limits this counter-clockwise travel of the pawl 20 to an amount just sufficient to free the tooth 24 from the ratchet wheel 19. Thereafter, the member 22, pin 23 and pawl 20 continue to move as a unit about column 5 in a clockwise direction. When the handle has been pushed as far forward as is convenient to the rider a backward pull is then exerted on the handle. This tends to move member 22 and pin 23 counter-clockwise about the column 5. As the pin 23 moves, the tail end of pawl 20, carrying the tooth 24, lags because of its inertia. This lag causes pawl 20 to move clockwise slightly about pin 23 as the latter advances counter-clockwise. The tooth 24 is thereby carried into engagement with the teeth of the stationary ratchet wheel 19 and locks the member 22 and handles 21 against further movement. The pull exerted by the rider on the locked handle 21 then becomes effective to rotate the seats clockwise about their bearing in column 5. The handle 21 is then advanced once more and so on. If the handle is not used for driving then it is carried round with the rider with the pawl tooth 24 out of engagement with the ratchet wheel 19.

For packing and storage purposes the seats may be disassembled from the radial arms 3 and the leg extensions 7 may be similarly disassembled from the legs 6. This renders the entire toy a compact unit which may be readily stored away in a small cupboard.

What I claim is:

1. A round-about which includes a hollow central support vertically mounted upon a plurality of radial legs, a vertical shaft rotatably mounted in said central support, a plurality of radial arms fixed to and extending from said vertical shaft and carrying seats at their outer ends, a horizontal ratchet wheel fixedly secured to and concentric with said central support, a horizontally extending hub member rotatably mounted on said central support and carrying operating handles for the riders, a pivot pin fixed to said rotatable hub member at a point eccentric with respect to said central support, a pawl rotatably mounted on said pivot pin and having arms extending unequal distances from opposite sides of the pin so that the pawl is unbalanced, a tooth on the longer pawl arm adjacent the end thereof for engaging said ratchet wheel, the unbalance of said pawl being effective when said hub member is rotated, to make the pawl tooth lag behind the motion of the pivot pin so that the pawl is rotated relative to the hub member, said pawl being rotatable on its pivot pin through an angle great enough with relation to the spacing of the tooth from the pivot pin so that the component of motion of the pawl tooth in a radial direction with respect to the vertical shaft is sufficient to move the tooth alternately into and out of engagement with the ratchet wheel teeth, whereby rotation of the rotatable hub member in one direction causes the pawl to rotate on its pivot and disengage the pawl tooth completely from the ratchet wheel so that said hub member may rotate freely without clicking of the pawl over the ratchet wheel, and rotation of the rotatable hub member in the opposite direction causes the pawl to rotate on its pivot so as to engage the pawl tooth with the ratchet wheel and effect rotation of the radial arms and seats.

2. A round-about as claimed in claim 1 in which a stop is provided on the shorter arm of the pawl to abut against the central support to limit the clearance between the pawl tooth and the ratchet wheel when the tooth is disengaged from the ratchet wheel.

HARRY SEBEL.

REFERENCES CITED

The following references are of record in the file of this patent:

UNITED STATES PATENTS

| Number | Name | Date |
|---|---|---|
| 374,206 | Schwager | Dec. 6, 1887 |
| 879,937 | Woodward | Feb. 25, 1908 |
| 927,508 | Draper | July 13, 1909 |